(12) United States Patent
Brett

(10) Patent No.: US 7,532,219 B2
(45) Date of Patent: May 12, 2009

(54) IMAGE PROCESSING

(75) Inventor: Stephen David Brett, Swanley Village (GB)

(73) Assignee: Pandora International Ltd., Kent (GB)

( * ) Notice: Subject to any disclaimer, the term of this patent is extended or adjusted under 35 U.S.C. 154(b) by 223 days.

(21) Appl. No.: 11/107,214

(22) Filed: Apr. 15, 2005

(65) Prior Publication Data

US 2005/0259184 A1 Nov. 24, 2005

(30) Foreign Application Priority Data

Apr. 16, 2004 (GB) .................................. 0408557.7

(51) Int. Cl.
*G09G 5/00* (2006.01)
*G09G 5/02* (2006.01)
*G06K 9/00* (2006.01)

(52) U.S. Cl. ...................... 345/581; 345/591; 345/601; 345/602; 345/603; 345/604; 382/162; 382/167

(58) Field of Classification Search ................. 345/581, 345/591, 601, 603, 604; 382/162, 167
See application file for complete search history.

(56) References Cited

U.S. PATENT DOCUMENTS

| | | | |
|---|---|---|---|
| 3,558,806 A | | 1/1971 | Monahan et al. |
| 4,525,736 A | | 6/1985 | Korman |
| 4,901,258 A | * | 2/1990 | Akiyama ...................... 702/80 |
| 5,128,769 A | * | 7/1992 | Arai et al. ................... 348/363 |
| 5,142,273 A | * | 8/1992 | Wobermin .................. 345/690 |
| 5,218,671 A | * | 6/1993 | Liao et al. ................... 345/595 |
| 5,337,166 A | * | 8/1994 | Ikegami ....................... 358/518 |
| 5,412,773 A | * | 5/1995 | Carlucci et al. ............. 715/723 |
| 5,450,500 A | | 9/1995 | Brett |
| 5,477,335 A | * | 12/1995 | Tai .............................. 358/2.1 |
| 5,737,032 A | * | 4/1998 | Stenzel et al. ............... 348/649 |
| 5,850,471 A | | 12/1998 | Brett |
| 5,874,988 A | * | 2/1999 | Gu ............................... 348/97 |
| 6,016,168 A | * | 1/2000 | Kim ........................... 348/661 |
| 6,072,499 A | * | 6/2000 | Brett .......................... 345/589 |
| 6,307,644 B1 | * | 10/2001 | Ohta .......................... 358/1.9 |

(Continued)

FOREIGN PATENT DOCUMENTS

GB    2 381 148 A    4/2003

(Continued)

*Primary Examiner*—Kee M Tung
*Assistant Examiner*—Jacinta Crawford
(74) *Attorney, Agent, or Firm*—McDonnell Boehnen Hulbert & Berghoff LLP

(57) ABSTRACT

The invention relates to a method of modifying the appearance attributes of digital images comprising: defining in a first channel of a color corrector a first set of appearance attribute corrections to be applied to the images; determining a first set of appearance attribute correction parameters corresponding to the first set of appearance attribute corrections; in the first channel of the color corrector defining at least one further set of appearance attribute corrections to be applied to the images; determining a set of appearance attribute correction parameters corresponding to the or each of the further sets of appearance attribute corrections; and combining each of the sets of appearance attribute correction parameters into a single set of appearance attribute correction parameters. The invention also relates to a method where the channel is implemented in software and to apparatus and software for carrying out the methods.

7 Claims, 4 Drawing Sheets

U.S. PATENT DOCUMENTS

| | | | |
|---|---|---|---|
| 6,337,692 B1 * | 1/2002 | Rai et al. | 345/594 |
| 6,459,425 B1 * | 10/2002 | Holub et al. | 345/207 |
| 6,850,249 B1 * | 2/2005 | Gu | 345/623 |
| 6,954,549 B2 * | 10/2005 | Kraft | 382/167 |
| 7,081,900 B2 * | 7/2006 | Gonsalves et al. | 345/594 |
| 2002/0008709 A1 * | 1/2002 | Suzuki | 345/600 |
| 2005/0073529 A1 * | 4/2005 | Gu | 345/589 |

FOREIGN PATENT DOCUMENTS

GB      2381148 A      4/2003

* cited by examiner

IMAGE PROCESSING

INTRODUCTION

The present invention relates to image processing and in particular to the conversion of film images to video images and the appearance attribute correction of such images.

In producing entertainment media such a film or television, it is often desired to change the reproduced colour of the scene. This is achieved by correcting digital image data obtained by scanning cinema style motion picture film in a telecine machine. The changes may be to correct for defects in the scene capture, such as shooting film in the evening sun, in which case everything may look too yellow or golden, or often to change the colour of the original scene to make it appear different to the real scene.

Many systems exist that can perform these operations, including the Applicant's Digital Colour processing system (DCP) dating back to 1994. Generally there are two methods of changing colour. The first method revolves around the implementation of formulae or algorithms to calculate a new colour from an old colour, and operator input. The second relies on a lookup table, in which case the old (or input) colour is used as an index into a table that contains the output colour.

Examples of formulae based systems include the colour correction capabilities implemented in Telecine machines from Rank Cintel Ltd, in their URSAR$^{RTM}$ product from 1989 onwards. Examples of lookup based products include the Magnascan product range manufactured as early as 1976 by Crosfield Electronics Ltd.

These latter systems constructed a 3-D lookup table, which had input indices of Red, Green, and Blue, at which locations the corresponding amount of Cyan, Magenta, Yellow and Black ink to give the corresponding colour were stored. Typically these 3-D tables (or cubes) were of size 16×16×16 locations, giving 4096 data values. These values were pre-computed by software based algorithms, and interpolation techniques of various types were used to obtain intermediate values.

With the former colour correction systems that are algorithm based, it is usual to offer fixed channels of adjustment, with one channel sometimes being defined in terms of a colour, and each channel being a physical (hardware) device. Typically, devices such as the colour correction systems supplied by Rank Cintel Ltd. from 1975 onwards in the Mk III telecine had six channels, each one representing a fixed area of colour space. These corresponded to Red, Green, Blue, Cyan, Magenta, and Yellow. Each channel consisted of a physical circuit that carried out the transformation of that colour region.

The Applicant's 1993 DCP system described in U.S. Pat. No. 5,450,500 allowed the redefinition of these colour channels, to the extent that if it were required to alter six different reds this could be done. However, there was always a limit to the number of channels that were obtainable. So, if it were required to independently alter six shades of red and to also alter a range of blues, this could not be done at the same time. Several techniques were proposed to increase the number of channels available. One possible method is to use more hardware channels, but for this there is a cost increase. Another method is to process material in several passes. In this method, the image sequence would pass through the colour correction system, where the six channels would be used to alter the six different red areas. The processed material would be stored, probably on a solid state medium, and then pass through the colour correction system again, at which time the blue colours would be altered. Although this method avoids the cost of providing additional hardware, it takes substantially longer (in fact at least twice as long) and could also reduce the final quality of image data obtained.

A combination of channel and cube processing is disclosed in the Applicant's United Kingdom Patent Application GB 2381148 A. In this system, each channel of a colour corrector is used to determine a respective set of colour corrections to be made. The sets of colour corrections are then combined into a single lookup table to be applied to the image data via a single channel of the colour corrector.

The present invention proposes a system in which only a single hardware channel need be provided.

SUMMARY OF THE INVENTION

According to a first aspect, the invention provides a method of modifying the appearance attributes of digital images comprising:

defining in a first channel of a colour corrector a first set of appearance attribute corrections to be applied to the images;

determining a first set of appearance attribute correction parameters corresponding to the first set of appearance attribute corrections;

in the first channel of the colour corrector defining at least one further set of appearance attribute corrections to be applied to the images;

determining a set of appearance attribute correction parameters corresponding to the or each of the further sets of appearance attribute corrections; and combining each of the sets of appearance attribute correction parameters into a single set of appearance attribute correction parameters.

The method preferably further comprises the step of applying the single set of appearance attribute correction parameters to the digital images.

Thus, in the method of the invention, only one hardware channel need be provided in the colour processor. Each frame of HDTV is 1920×1050 pixels of 24-bit colour. Therefore, at 25 frames per second, the channel has to process over 150 Megabytes per second. The figures are actually a bit more complex as these are the active pixels. There are actually lines/pixels which you don't see. In fact the channel must process between 50 and 75 million pixels per second i.e. one pixel every 12-20 nanoseconds. This kind of processing power requires expensive hardware. Therefore reducing the colour corrector from 6 or 12 channels down to one provides a large cost saving.

Further, the method of the invention is advantageous in that there is no limit to the number of colour corrections which can be applied at any one time. Further, once the colour corrections have been decided on by the operator, they can then be applied to the digital images in real time.

In a preferred embodiment, the digital images are obtained by scanning frames of cinematographic film.

In a preferred embodiment, the single set of appearance attribute correction parameters is combined into a lookup table.

It would be further advantageous to provide a method which does not require the use of any hardware channels and which can operate purely in software.

In the method of the invention using only one hardware channel, the final processing of the film can be performed in software. This involves, for each pixel, taking the colour of the pixel, performing a lookup and an interpolation in the lookup table to find the new colour of the pixel and outputting that new value. Each digital image corresponding to a film frame contains typically approximately 2 million pixels, but the lookup and interpolation can be performed fast enough to keep up with the real time frame rate (typically ¹/₂₅th of a second).

While the operator is adjusting the colour manipulation by defining the appearance attribute corrections however, the processing is being done through the hardware channel. This is because, every time the operator adjusts the colour manipulation, every pixel in the frame requires a new value to be output to the screen. Software is not capable of cost-effectively performing full colour transformation calculations on each of the approximately 2 million pixels while still maintaining the real time frame rate.

Preferably therefore, the first channel of the colour corrector is implemented in software.

The first channel preferably comprises a software algorithm which creates a lookup table for the cardinal colour points of the image data. As only the cardinal points are calculated, the software is able to calculate these points and to interpolate between them within the time allowed by the frame interval.

The preferred embodiment of the invention therefore provides a method of digital colour processing in which no hardware channel is required. Instead of using the output from the operator's controls as inputs to the hardware channel, the method according to the present invention uses them as inputs to a software algorithm which dynamically creates a 16×16×16, 3-dimensional lookup table of cardinal colour points. This lookup table is then used to process the approximately 2 million pixels of the frame by a lookup and interpolation method and thus can provide a real time image to the operator incorporating the colour change as currently defined by his controls.

In this method, the software only has to perform colour correction calculations for each of the 4096 cardinal points of the cube, rather than for each of the 2 million pixels of the frame. It is therefore possible for the software to keep up with a real time frame rate.

The use of a software algorithm to create a lookup table containing only the cardinal points is believed to be novel and inventive in its own right. From a second aspect therefore, the present invention provides a method of adjusting digital image data in real time according to operator input variables comprising the steps of:

using the operator input variables which define a set of appearance attribute corrections to be applied to the image data to calculate a lookup table containing cardinal points for the set of appearance attribute corrections; and using the lookup table together with an interpolation algorithm to adjust the image data.

According to a further aspect, the present invention provides a method of adjusting digital image data in real time according to operator input variables comprising the step of:

using the operator input variables which define a set of image alteration data to create a lookup table containing cardinal points of the set of image alteration data and using the lookup table together with an interpolation algorithm to process the image data and output the altered image data.

Preferably, the method is carried out using software only.

In the preferred embodiment, the lookup table is combined with a stored cumulative lookup table and the resulting combined lookup table is used to process the image data and output an altered image. Preferably, the method further comprises the steps of:

upon the operator's command, storing the operator input variables;

storing the combined lookup table as the cumulative lookup table; and resetting the operator input variables.

An operator may wish to alter one set of appearance attribute correction parameters to be applied to the digital image data. Preferably therefore, the method further comprises the step of storing each set of appearance attribute correction parameters as determined.

Still more preferably the method may include the steps of modifying one or more of the sets of stored appearance attribute correction parameters; and recombining each of the stored sets of appearance attribute correction parameters into a single set of appearance attribute correction parameters.

In this way, an operator may alter the corrections to be made to an image without having to alter each successive set of alterations combined in the lookup table.

When specifying colour regions to be altered by a set of appearance attribute corrections, regions can either be non-overlapping in colour space, or can overlap. In the second case, both the first and the second set of adjustments will be applied to colours that fall in this overlapping region.

Further enhancements can be made to the method of the invention. For example, if it is desired to process images differently for regions that are inside and outside an operator specified region such as a window, mask (which may be a regular shape such as a rectangle, or may be drawn by hand), or key, then two lookup tables can be used. The first region can be processed by the first table, and the second region can be processed by the second table.

To ensure that the edges between the first and second regions are not too pronounced, it is possible to process picture elements that are near to the boundary of the regions through both cubes, and to take an average or a weighted function of the two results. This may use a weighting function that is dependent on the distance from the boundary between the two edges.

Preferably therefore, the method further comprises the step of defining regions of an image to which different appearance attribute corrections are to be applied; obtaining a set of appearance attribute correction parameters for each region; and where the regions overlap, applying the appearance attribute correction parameters for both regions to that portion of the image data. Still more preferably, image data for parts of the image located adjacent the boundary between regions can be adjusted by a weighted average of the attribute correction parameters obtained for each region.

According to a further aspect, the present invention provides a method of adjusting digital image data according to operator input variables, wherein more than one image data alteration has been defined, comprising the steps of:

processing each image data alteration separately;

identifying boundaries between different regions of alteration; and for each image data point, combining the outputs of each image data alteration according to a weighting function dependent upon the distance of the image data point from each region boundary.

From a further aspect the invention provides a method of modifying the appearance attributes of digital images comprising:

a) defining in a hardware channel of a colour corrector a first set of appearance attribute corrections to be applied to the images;

b) adding the first set of appearance attribute corrections to a cumulative software lookup table;

c) in the hardware channel, defining one or more further sets of appearance attribute corrections to be applied to the images;

d) adding each set of appearance attribute corrections to the cumulative software lookup table before defining any further sets of appearance attribute corrections, wherein the lookup table combines successive sets of appearance attribute corrections defined in the hardware channel of the colour corrector in a single lookup table; and e) modifying the appearance attributes of the digital images by applying the appearance attribute corrections defined in the software lookup table;

wherein an intermediate visual output is displayed to an operator during steps a) to d) showing the combined effects of the appearance attribute corrections defined in the hardware channel and the previously defined appearance attribute corrections held in the cumulative lookup table.

From a still further aspect the invention provides a method of adjusting digital image data according to operator input variables, wherein more than one image data alteration has been defined, comprising the steps of:

processing each image data alteration separately;

identifying boundaries between different regions of alteration; and for each image data point, combining the outputs of each image data alteration according to a weighting function dependent upon the distance of the image data point from each region boundary.

From a yet further aspect the invention provides apparatus for modifying the appearance attributes of digital images comprising:

a hardware channel for defining a set of appearance attribute corrections to be applied to the digital images;

a software cumulative lookup table for modelling a set of appearance attribute corrections to be applied to the digital images;

wherein the apparatus is configured to add the appearance attribute corrections defined in the hardware channel to the appearance attribute corrections modelled by the software lookup table, and to apply the appearance attribute corrections modelled by the cumulative software lookup table to the digital images, the apparatus further comprising:

a display for displaying an intermediate output to an operator, the intermediate output comprising the combination of the appearance attribute corrections defined in the hardware channel and the appearance attribute corrections modelled in the cumulative software lookup table.

From a still further aspect the invention provides apparatus for adjusting digital image data in real time according to operator input variables comprising:

software which uses the operator input variables which define a set of appearance attribute corrections to calculate a lookup table containing cardinal points for the set of appearance attribute corrections; and software which adjusts the digital image data using the lookup table and an interpolation algorithm.

The present invention also extends to apparatus for carrying out the above described methods and also to software for carrying out the above described methods.

BRIEF DESCRIPTION OF THE DRAWINGS

Preferred embodiments of the present invention will now be described by way of example only, with reference to the accompanying drawings in which.

DESCRIPTION OF THE PREFERRED EMBODIMENTS

Various methods of processing and adjusting digital image data have been known for some time. Such methods are useful, for example, when taking the output from a Telecine machine which scans cinematographic film and outputs digital image data corresponding to the images of the original film.

Figure 1:
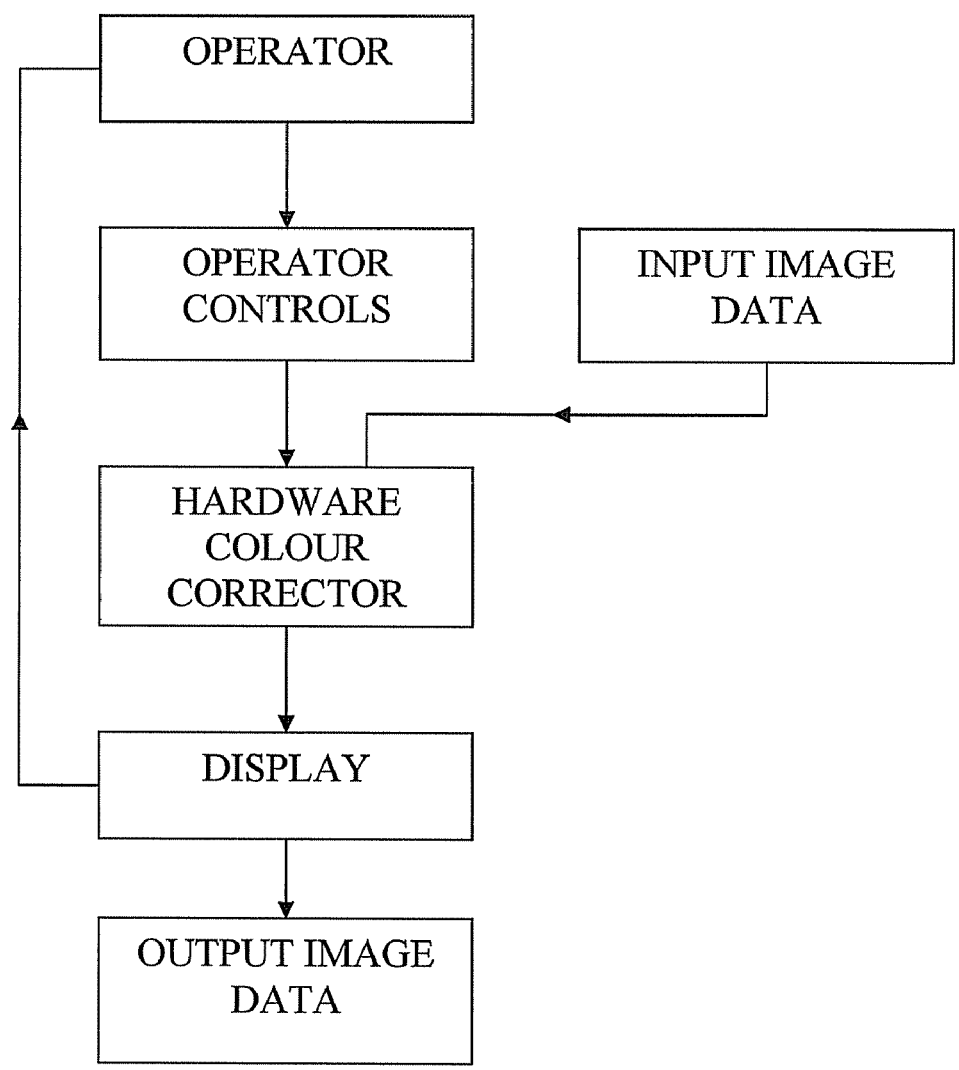
FIG. 1 is a flow diagram showing a prior art method of digital image alteration.

FIG. 1 is a flow diagram which describes a prior art method of processing digital image data and applying alterations to it.

In the method of FIG. 1, an operator has a number of hardware colour correction channels to control. Each channel is associated with a particular pre-defined colour space. In one typical implementation, there are six channels. The operator's controls are direct inputs to the hardware colour correction circuits which take input image data, alter the data to a degree specified by the operator's controls and output the data. This output is normally directed to a display on which the operator can see the effect that the colour correction is having on the input image data. The operator adjusts the controls for a particular channel until he is satisfied with the output. He can then store the corrections for that channel before carrying out colour corrections in the other channels as required. The relevant portions of the film are then scanned through and the corrections from each of the six channels are applied to the digital image data obtained.

The equipment can also be used for real time live broadcasts.

With this equipment, the operator is limited to one colour correction for each hardware channel. A typical colour corrector would have six channels. Therefore, if the operator wanted to apply more than six colour corrections, he would have to pass the data through once for the first six corrections, store the results, set up further corrections and then pass the stored data through the channels again.

Figure 2:
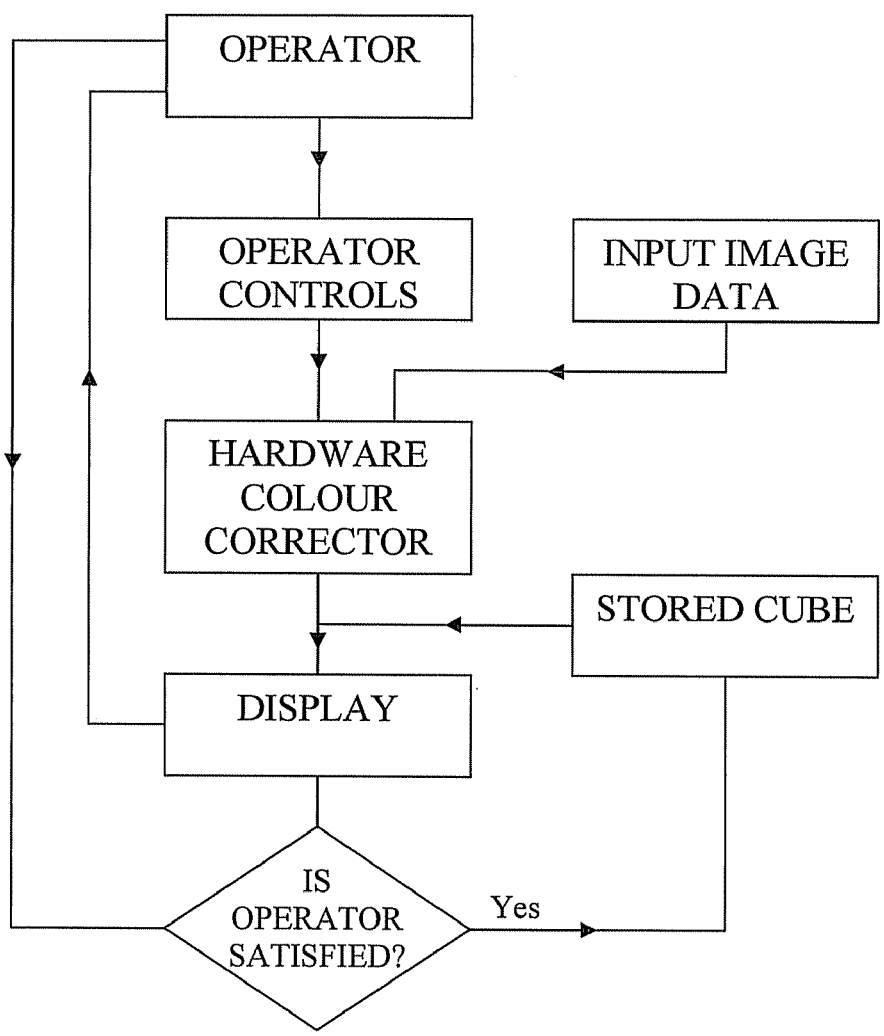
FIG. 2 is a flow diagram showing another improved prior art method of digital image alteration.

FIG. 2 is a flow diagram showing an improved prior art colour corrector. In this colour corrector, the operator can set up colour corrections in the hardware channels and then when he is satisfied, use them to create a software lookup table (cube) which models the functions defined by the hardware channels. As the lookup table is now capable of providing an equivalent correction to the hardware channels, the hardware channels can be used for other further colour corrections. The output of this system is then the corrections defined by the lookup table together with the corrections defined by the hardware channels. This combined output can then be written back to the lookup table. In this way, the operator can build up an unlimited number of corrections which are all applied to the data in one pass through the colour corrector.

It has now been realised that the system of FIG. 2 can be used to provide a colour corrector containing only a single hardware channel.

The typical mode of operation is as follows. The one existing channel is used to define a region of colours to be adjusted. The channel is used to make adjustments to that range of colours. Operators of such equipment usually think in terms of Hue, Saturation and Luminance. It is therefore desirable to make the channel work in control parameters of Hue, Saturation and Luminance. When that particular colour region has been modified to the satisfaction of the operator, the hardware channel is used to calculate a 3 dimensional equivalent lookup table (a 'cube'). This can be done by generating ordinate values of Red, Green and Blue in regular steps. This may be, for example (in 8 bit precision),
R=0, G=0, B=0
R=0, G=0, B=15
R=0, G=0, B=31
. . .
R=0, G=0, B=255
R=0, G=15, B=0
R=0, G=15, B=15
. . .
R=255, G=255, B=255

So for each and every value of R, G and B, the hardware channel is used to convert the R, G and B values to corresponding Hue, Saturation and Luminance values. These will in turn, via the operator specified adjustment parameters, be converted in to H', S', L'. These signals can then be processed through the channel into R', G', B' values. Thus at the coordinates R, G, B of the equivalent lookup table (the cube), the data R', G', B' corresponding to the modified values is stored.

The cube (together with interpolation algorithms) and the hardware channel are now performing equivalent processing, so the hardware channel can be reset to specify a second area of colour space to be altered.

Changes can then be made to the Hue, Saturation and Luminance of the second region. These second set of changes are shown in conjunction with the first changes, as the data from the physical channel is then processed by the cube to add on the effects of the first adjustments. When this second region has been adjusted to the operator's satisfaction, a new set of cube lookup data that represents the previous changes together with the new modifications is created. This is accomplished by generating the ordinate set of R, G, B data (as above). These values are then converted to H, S, L, then H", S", L", via the second set of adjustments made. This in turn is converted to R", G", B". Now to amalgamate the two colour alterations, this is fed through the colour cube, to generate new resultant data R^, G^, B^. This new data is written back to the location of address R, G, B. Thus the two sets of data are merged, and the operator settings can then be zeroed again. This process can be carried out for as many different sets of adjustments as the operator wishes to use. There is no upper limit. When the operator has finished implementing channels, he can use the resultant colour cube to process images in real time. This method is thus capable of processing a large number of channels of colour correction with only one physical channel, while still processing images in real time.

Figure 3:
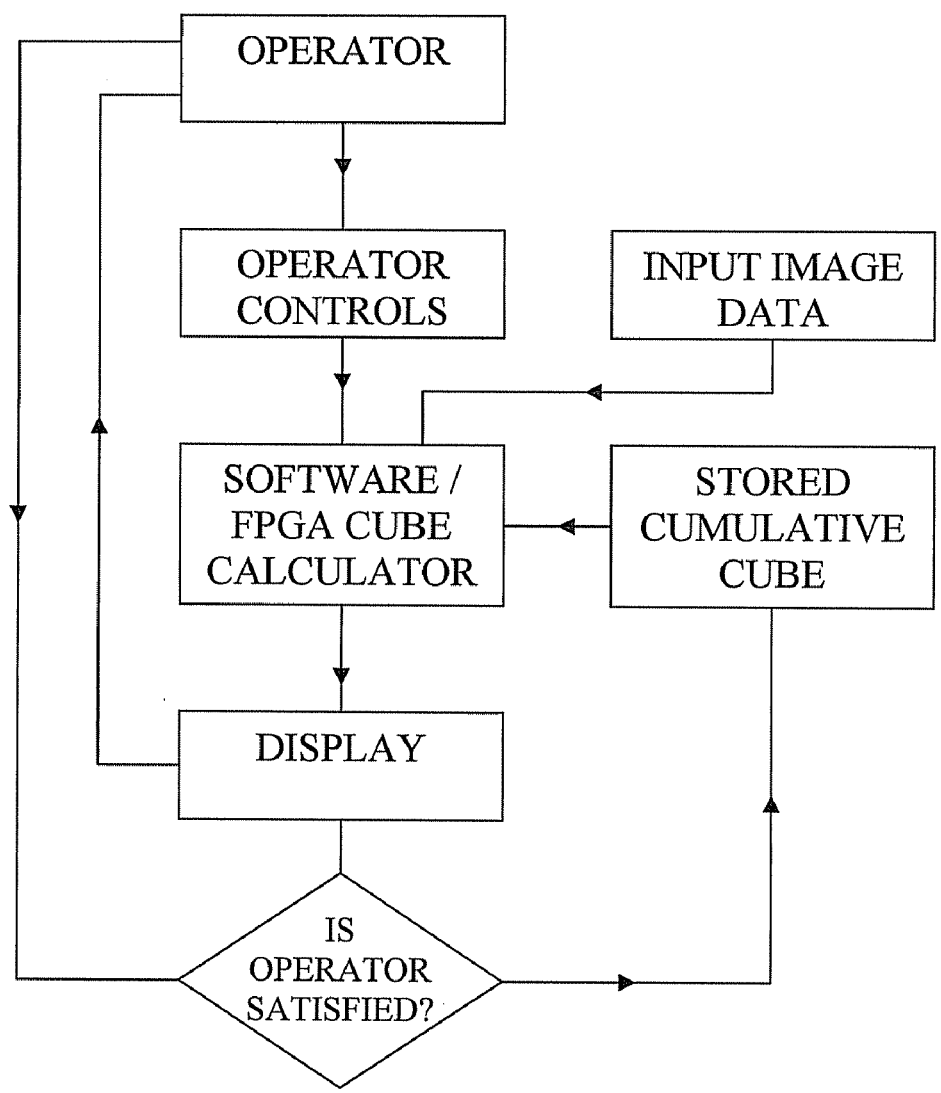
FIG. 3 is a flow diagram of a method according to the first aspect of the present invention.

FIG. 3 is a flow diagram showing an alternative method according to the present invention. In this method it is not necessary to provide any hardware colour correction channels. All the data processing is done by software.

In this method, the operator has channel controls as in the previous systems. These channel controls define a function for converting the input colour data to the output colour data. However, instead of creating the output image by applying this function to every pixel of the input frame in turn, the software creates a 3-dimensional colour correction lookup table which comprises cardinal points of the correction function.

For example, in 24-bit colour (8 bits for each of Red, Green and Blue), each primary colour can take any value between 0 and 255. To calculate every point in a colour correction cube would therefore mean calculating colour corrections for over 16 million different colours. Instead, only cardinal points are calculated. These cardinal points are spaced at regular intervals throughout the full colour range. The more cardinal points which are calculated, the more accurately the full colour correction cube will be represented. In the preferred embodiments, the cardinal points are chosen for R, G, B values of 0, 15, 31, . . . , 255. Thus the cube comprises only 17×17×17=4913 points and therefore can be created with only 4913 colour correction calculations. In an alternative embodiment, the cube comprises only 16×16×16=4096 points and the cardinal points are evenly spaced by R, G, B values of 17.

These cardinal points can then be used with interpolation algorithms to apply the correction function to the input image data. In this way, the colour correction calculations are limited. For example, if the colour correction cube comprises 16×16×16 points, a total of 4096 colour correction calculations are required to create the cube and then 2 million lookup and interpolate operations are required to display a corrected image (in High Definition Television, each frame is 1920× 1050 pixels). As the colour correction calculations are time consuming compared with the lookup and interpolate operations, this method is significantly faster than performing the 2 million colour correction calculations required to display the output image directly.

With this time saving it is possible to use software to perform the image alteration in real time (25 frames per second for television) thus negating the need for and the associated cost of any hardware channels.

Although some information is lost by creating a lookup table having only 4096 points for the original correction function and then interpolating between those points, the smoothing effect achieved by the interpolation actually often gives a better looking image than that obtained using the original correction function in hardware channels.

The algorithms which can be used for colour correction are many & various. They include systems as old as those disclosed in U.S. Pat. No. 3,558,806 (Monahan), U.S. Pat. No. 4,525,736 (Korman) and Pandora=s own system described in U.S. Pat. No. 5,450,500

The software in the colour corrector of the present invention may execute in a general purpose processor, or be implemented in an FPGA (Field Programmable Gate Array).

A preferred implementation of the present invention is to implement the software in FPGAs from Xilinx (www.xilinx.com). Typical suitable FPGAs are the Xilinx 2VP7 (Upgradeable to 2VP70's), each with one 350 Mhz Power PC, 44 multiplier blocks, and 1108 logic cells. Or Xilinx 2VP20's (upgradeable to 2VP50's), each with 2Power PC 405's, 88 multiplier blocks and 2088 logic cells. Each FPGA has its own RAM block. The Xilinx 2VP7 or 2VP70, having its own inbuilt PowerPC processor is ideally suited to the software colour corrector implementation, as this can run on the PowerPC.

In a particularly preferred implementation the 4096 points of the colour cube are stored in the CACHE memory of the Xilinx. This memory is very fast, and dual ported. It is very close to the Processor on the chip (in a connectivity sense). Allocation of this CACHE memory is a setup specification option in programming the Xilinx chips.

Typical networking to connect together such processing boards is the PCI-Express backplane. External connections to and from this system are ideally by XAUI protocol.

In preferred embodiments, more than one image alteration is defined and these alterations may overlap, either in real space or in colour space.

Figure 4:
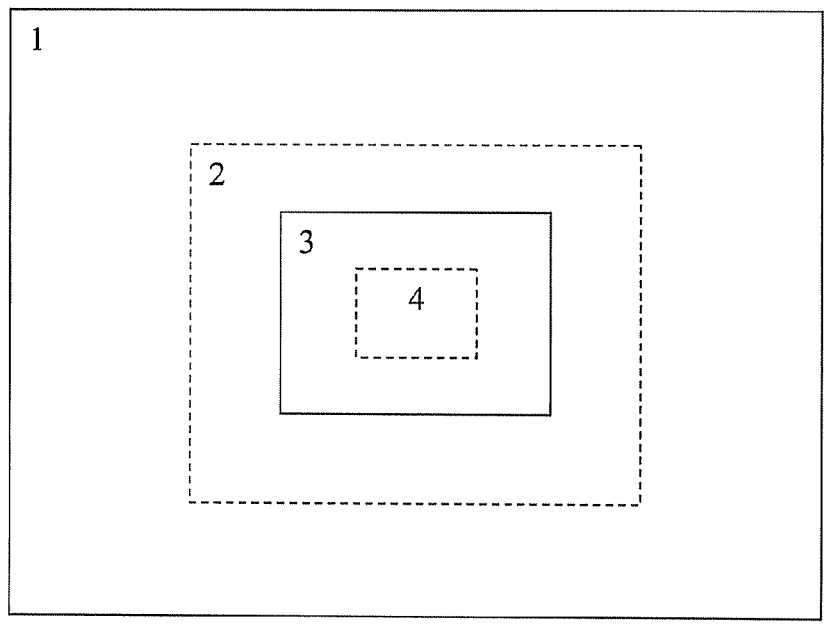
FIG. 4 shows overlapping regions of image alteration and an example of a weighting function for combining them.

This case is illustrated in FIG. 4. In this illustration the whole image is shown (Numbered 1, delineated by a solid line). Out of this image a region is chosen. This is chosen by any of the methods above. In this case it is a specified rectangle, numbered 3 and delineated also by a solid line. An inside boundary is then created (delineated 4 in dashed lines) and outside boundary (numbered 2, also in dashed lines). The distance between the dashed and solid lines is operator specified.

Thus at a point on outside dashed boundary 2, only the values in the outside cube have any effect. On the inside boundary 4, only the inside cube has an effect. For points just inside the outer boundary 2, most of the effect comes from the outside cube, and a little of the effect comes from the inner cube. The way this is decided is to put the values of pixels in the region between boundary 2 and boundary 4 through both cubes and determine new values R' G' and B' from Cube 1, and R" G" and B" from Cube 2. Then dependent on the relative distances from the boundaries 2 and 4, a weighted average is calculated. Typical algorithms for this could be of the form $$Vx = x/(x+y)V2 + y/(x+y)V1$$

Figure 5:
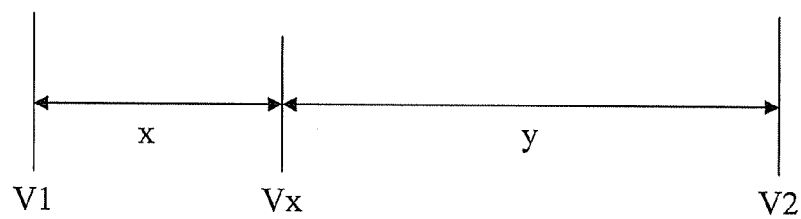
FIG. 5 schematically represents a typical algorithm by which the overlapping regions can be combined.

Such an algorithm is depicted in FIG. 5. V1 is the value for a pixel given by Cube 1 and V2 is the value for the same pixel given by Cube 2. x and y are the distances of that pixel from the boundaries 2 and 4.

Another potential addition to the system is to include other parameters than just the input pixel R, G and B. One possible addition includes texture in the form of graveliness or grassiness. The Applicant's U.S. Pat. No. 5,850,471 introduces the concepts of such parameters. As is well known in the art, texture can be defined by the frequency of image components such that a flat portion of an image would have a low frequency whereas a gravelly portion would have a higher frequency. To include this into the invention as described here, a fourth input parameter is used as well as the conventional Red, Green and Blue. Whilst it is hard for the reader to imagine a 4 dimensional 'cube' (A Hypercube) since there is no physical cube, and all memory is mapped into a one dimensional structure, this can equally well apply to a four dimensional cube. The interpolation techniques can be adapted to 4 Dimensions merely by extension of the three dimensional mathematics.

The above description is of the preferred embodiments only and is not intended to be in any way limiting. The scope of the invention is as defined in the appended claims.

What is claimed is:

1. A method of modifying the appearance attributes of a stream of digital video images comprising:
   on a first occasion, passing the stream of digital video images through a colour corrector in a single channel, viewing the video images and defining a first set of appearance attribute corrections in a first region of colour space to be applied to the images, determining a first set of appearance attribute correction parameters corresponding to the first set of appearance attribute corrections, storing the first set of appearance attribute correction parameters, and generating a first lookup table for implementing said first set of appearance attribute corrections;
   on a second occasion, passing the stream of digital video images through said colour corrector in said single channel, viewing the video images, and defining a second set of appearance attribute corrections in a second region of colour space to be applied to the images, determining a second set of appearance attribute correction parameters corresponding to the second set of appearance attribute corrections, storing the second set of appearance attribute correction parameters with the first set of appearance attribute correction parameters in a combined single set of appearance attribute correction parameters, generating a second lookup table for implementing said second set of appearance attribute corrections, and merging the first and second lookup tables to generate a cumulative lookup table for implementing the combination of said first and said second sets of appearance attribute corrections; and
   on a third occasion, passing the stream of digital video images through said colour corrector in said single channel and applying the single set of appearance attribute correction parameters to the video images so as to implement said first and second sets of appearance attribute corrections to the video images.

2. A method as claimed in claim 1, wherein the digital images are obtained by scanning frames of cinematographic film.

3. A method as claimed in claim 1, wherein the single channel of the colour corrector comprises a Field Programmable Gate Array.

4. A method as claimed in claim 3, wherein the Field Programmable Gate Array is configured to create a lookup table for the cardinal colour points of the image data.

5. A method as claimed in claim 1, further comprising the steps of:
   retrieving one of said first and second sets of appearance attribute correction parameters;
   modifying said one of the first and second sets of appearance attribute correction parameters; and, after modification
   recombining said one of the first and second sets of appearance attribute correction parameters with the other of the first and second sets of appearance attribute correction parameters into said combined single set of appearance attribute correction parameters.

6. A method as claimed in claim 1, further comprising the steps of:
   defining spatial regions of an image to which different appearance attribute corrections are to be applied;
   obtaining a set of appearance attribute correction parameters for each spatial region; and
   where the spatial regions overlap, applying the appearance attribute correction parameters for both spatial regions to that portion of the image data.

7. A method as claimed in claim 6, wherein image data for parts of the image located adjacent the boundary between spatial regions can be adjusted by a weighted average of the attribute correction parameters obtained for each spatial region.

* * * * *